(No Model.)

J. COOK.
TRANSPLANTING POT.

No. 402,722. Patented May 7, 1889.

WITNESSES:
Phil C. Dieterich.
C. Sedgwick

INVENTOR:
J. Cook
BY Munn & Co
ATTORNEYS.

UNITED STATES PATENT OFFICE.

JONAS COOK, OF MOUNT PLEASANT, NORTH CAROLINA.

TRANSPLANTING-POT.

SPECIFICATION forming part of Letters Patent No. 402,722, dated May 7, 1889.

Application filed August 22, 1888. Serial No. 283,412. (No model.)

*To all whom it may concern:*

Be it known that I, JONAS COOK, of Mount Pleasant, in the county of Cabarrus and State of North Carolina, have invented a new and Improved Transplanting-Pot, of which the following is a full, clear, and exact description.

Reference is to be had to the accompanying drawings, forming a part of this specification, in which similar letters of reference indicate corresponding parts in all the figures.

Figure 1:
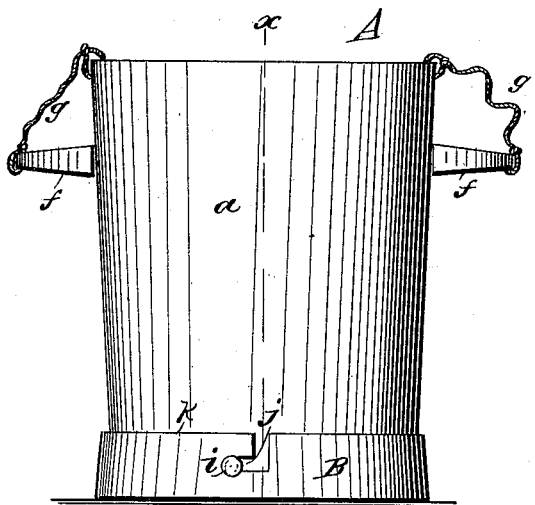
Figure 2:
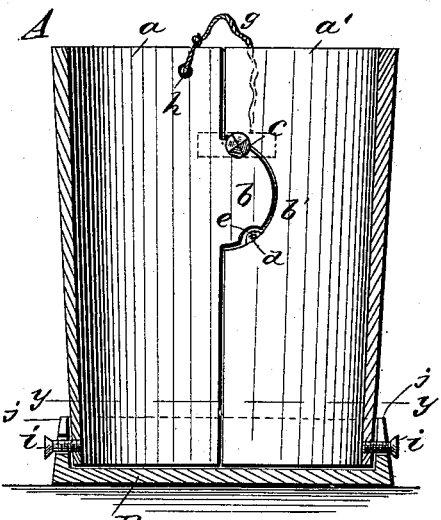
Figure 3:
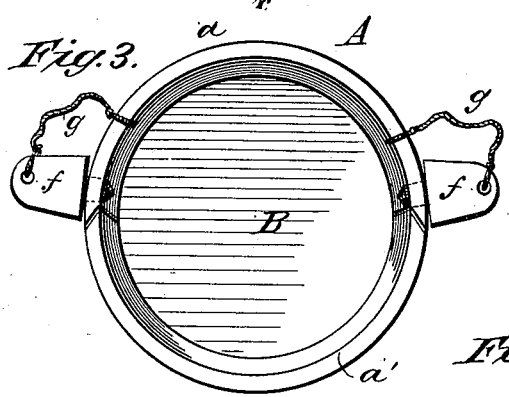
Figure 4:
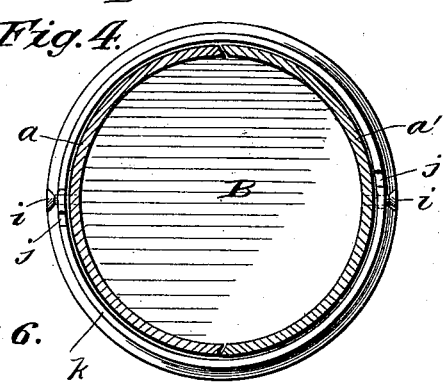
Figures 5, 6:
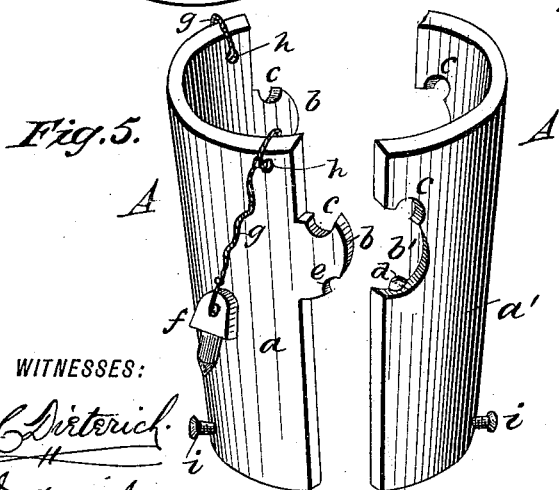
Figure 7:
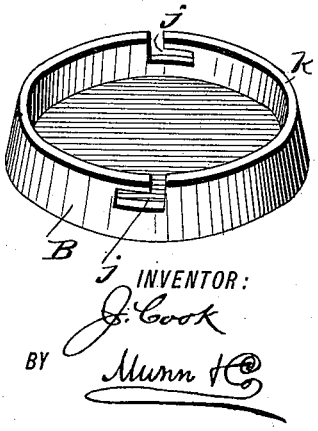

Figure 1 is a side elevation of my improved transplanting-pot. Fig. 2 is a vertical transverse section taken on the line $x\ x$ of Fig. 1. Fig. 3 is a plan view. Fig. 4 is a horizontal section taken on the line $y\ y$ of Fig. 2. Figs. 5 and 6 represent the two halves of the body of the pot, and Fig. 7 is a perspective view of the bottom of the pot.

The object of my invention is to construct a transplanting-pot in three parts, with the body made divisible and the bottom removable.

My invention consists in a pot formed of clay or other suitable material and having a body divided longitudinally and furnished with fastening devices, and having a removable bottom attached to the body, all as hereinafter more fully described.

The body A of the pot is formed of the halves $a$ and $a'$, which are fitted together upon a central vertical line on diametrically-opposite sides of the body, the adjoining edges being beveled, and the beveled edges on one side of the pot being oppositely arranged in respect to the beveled edges of the opposite side of the pot, to prevent the two halves $a\ a'$ from sliding one upon the other. The half $a$, near the top of the body, is provided with a rounded ear, $b$, which fits into a recess, $b'$, of corresponding form in the opposite half, $a'$, and in the ear $b$ and half $a'$ is formed a hole, $c$, one half of which is in the said ear $b$, the other half being in the part $a'$. In the lower part of the recess $b'$ there is a lug, $d$, which is received in a corresponding cavity, $e$, in the lower part of the ear $b$.

In the hole $c$ is inserted a key, $f$, which locks the two halves of the body of the pot together. The joints on both sides of the pot are alike, and the keys $f$ are connected with the body of the pot by cords $g$, passing through holes $h$ in the sides of the pot.

From diametrically-opposite sides of the lower part of the body of the pot, midway between the two halves, project the studs $i$, which are adapted for engagement with the L-shaped slots $j$ in the rim $k$ of the bottom B. The L-shaped slots $j$ are oppositely-arranged with respect to each other, and the said slots, together with the studs $i$, form a bayonet-joint connection between the body and bottom of the pot. The bottom B is preferably made of the same material as the pot, although I do not limit or confine myself to any particular material in the manufacture of my improvement.

The pot is filled with earth and the plant is raised in the usual manner, and when it is desired to transplant the plant the bottom B is removed from the body A of the pot, the pot is inserted in a hole in the ground, the keys $f$ are withdrawn, and the halves $a\ a'$ of the pot are pressed laterally away from the earth contained by the pot, and then raised from the earth, leaving the contents of the pot intact.

Having thus fully described my invention, I claim as new and desire to secure by Letters Patent—

1. The combination of the two-part bottomless body having locking projections and recesses on its meeting edges, a separate bottom closing the lower end of the body and forming a support for the earth contained therein, and an interlocking groove and projection connecting said bottom and lower end of the body, substantially as set forth.

2. The combination, in a transplanting-pot, with the sectional longitudinally-divisible bottomless body, of the detachable bottom closing the lower end of the pot, having an annular flange receiving the lower ends of the body-sections, and interlocking grooves and projections between said sections and the flange, substantially as set forth.

3. In a transplanting-pot, the combination of the part *a*, provided with ears *b*, the part *a'*, having recesses *b'* and furnished with lugs *d*, the keys *f*, and the removable bottom B, substantially as described.

4. In a transplanting-pot, the combination of the part *a*, provided with the ears *b*, the part *a'*, having the recesses *b'* and furnished with the lugs *d*, the keys *f*, and the removable bottom B, provided with a bayonet-joint connection, substantially as described.

JONAS COOK.

Witnesses:
JNO. K. PATTERSON,
J. R. ERVIN.